United States Patent
Demay et al.

(10) Patent No.: US 6,571,618 B2
(45) Date of Patent: Jun. 3, 2003

(54) SUPPORT DEVICE FOR A MOTORIZED FLYING INSTRUMENT IN A WIND TUNNEL

(75) Inventors: Jean-Paul Demay, Fresnes (FR); Laurent Carton, St Florent sur Cher (FR)

(73) Assignee: Aeropatiale Matra Missiles, Paris Cedex (FR)

( * ) Notice: Subject to any disclaimer, the term of this patent is extended or adjusted under 35 U.S.C. 154(b) by 0 days.

(21) Appl. No.: 09/884,161

(22) Filed: Jun. 20, 2001

(65) Prior Publication Data

US 2002/0023484 A1 Feb. 28, 2002

(30) Foreign Application Priority Data

Jun. 21, 2000 (FR) .............................. 00 07927

(51) Int. Cl.[7] .................................................. G01M 9/00
(52) U.S. Cl. ...................................................... 73/147
(58) Field of Search .......................................... 73/147

(56) References Cited

U.S. PATENT DOCUMENTS 4,920,791 A 5/1990 Griffin
5,370,349 A 12/1994 Bousquet et al.
5,866,813 A * 2/1999 Nakaya et al. ................. 73/147

FOREIGN PATENT DOCUMENTS

| DE | 11 72 875 B | 6/1964 |
| FR | 2159548 | 11/1971 |
| FR | 2641378 | 12/1988 |

* cited by examiner

*Primary Examiner*—Hezron Williams
*Assistant Examiner*—Andre Allen
(74) *Attorney, Agent, or Firm*—Thelen Reid & Priest LLP; Robert E. Krebs

(57) ABSTRACT

A device supports a motorized flying instrument in a wind tunnel. To carry out tests in a wind tunnel on a motorized flying instrument (10), with the motor on, under different attitudes hands off, the instrument is connected to the fixed structure (15) of the wind tunnel (11) by a mounting device (12) at least one of the supports (14, 16) of which is fitted with a length adjustment system, such as a hydraulic jack (28). This jack (28) is remote controlled, in real time, by a control system (42).

10 Claims, 5 Drawing Sheets

SUPPORT DEVICE FOR A MOTORIZED FLYING INSTRUMENT IN A WIND TUNNEL

This application claims priority under 35 U.S.C. §§119 and/or 365 to 0007927 filed in France on Jun. 21, 2000; the entire content of which is hereby incorporated by reference.

BACKGROUND

1. Technical field

The invention relates to a device designed to support a flying instrument such as a prototype or a missile model in a wind tunnel, so as to study the behavior of this instrument under different attitudes, with its motor on.

The invention applies to wind tunnel tests carried out on any type of motorized flying instrument and particularly a prototype or a scale one model, fitted with a motor, of a missile of which it is desired to study the behavior in real time in a supersonic tunnel, hands off, by reconstructing the changes in dynamics representative of the flight attitudes of the instrument.

2. Prior art

As shown in documents FR-A-2 159 548 and FR-A2 641 378, there is a known technique of wind tunnel testing the aerodynamic behavior of a model of a flying instrument such as an aeroplane by mounting this model on a boom connected to the fixed structure of the wind tunnel by a set of mechanisms allowing the attitude of the model being tested to be varied in real time. When this technique is used, the rear end of the model is connected to the front end of the boom and the latter extends backwards approximately in the extension of the model.

Support devices of this type make it possible to study, hands off, the aerodynamic behavior of the flying instrument surfaces which are in contact with the ambient air, when the attitude of the instrument changes in time.

On the other hand, such support devices cannot be used to study the behavior of a flying instrument whose motor or motors are switched on. Indeed, the presence of a boom approximately in the extension of the model, to its rear, does not allow a motor located in the longitudinal axis of the instrument to be switched on and greatly disturbs the airflow leaving a motor offset relative to this axis.

At the present time, when flying instruments are wind tunnel tested with their motors on, support devices of a different design are used. These support devices include several articulated supports connecting the instrument to the fixed structure of the wind tunnel. The articulated supports are presented usually in the form of arms or pylons at least one of which comprises length adjustment means. Most often, three or four articulated supports are used.

In such a support device, the articulated supports are offset towards the rear relative to the front part of the instrument, so as not to disturb the airflow in this zone. Moreover, to allow the behavior of the instrument to be studied while the motor is on, the articulated supports are also located clearly outside the airflow zones located upstream and downstream of the motor.

When such a support device is used to study the behavior of an instrument the motor of which is on, operators adjust the required configuration and flight attitude (sideslip value, incidence angle, etc.) by acting on the length adjustment means, before proceeding to a test. When another configuration and another flight attitude are to be tested, it is necessary to stop the instrument motor and to intervene again manually on the length adjustment means before proceeding to a new test.

This conventional technology is particularly long and tedious to implement. Moreover, it does not allow the dynamic behavior, in real time, of an instrument with its motor on to be studied. In particular, existing support devices are ineffectual for studying the behavior of an instrument with its motor on when it describes a pre-set trajectory or trajectory fraction.

BRIEF SUMMARY

The exact object of the invention is a support device designed to allow the study of the behavior of a motorized flying instrument in a wind tunnel when the instrument motor is on, by enabling a modification in real time of the attitude of the instrument for the articular purpose of simulating a trajectory or rajectory fraction followed by the latter.

In accordance with the invention, this result is obtained by means of a device able to support a motorized flying instrument in a wind tunnel, so as to study the behavior of said instrument, with its motor on, under different attitudes, said device including several articulated supports able to connect the instrument to a fixed structure of the wind tunnel, at places offset relative to airflow zones located around a front part of the instrument and upstream and downstream of the motor, at least one of said supports comprising length adjustment means, the device being characterised in that the length adjustment means are connected to remote control means able to modify in real time the instrument attitude.

Since the length adjustment means are remote controlled, the instrument attitude may be modified in real time, hands off. It thus becomes possible, particularly, to study the behavior of a flying instrument with its motor on, by simulating a trajectory or trajectory fraction followed by this instrument.

In a preferred embodiment of the invention, the supports include a front support, of invariable length, incorporating articulation means to at least two degrees of freedom of rotation around two axes oriented along two directions orthogonal to each other and to a longitudinal axis of the instrument, and two rear supports each incorporating length adjustment means and pivot connections.

To advantage, the front support is oriented approximately radially relative to the longitudinal axis of the instrument and arranged in a vertical plane passing through this axis. The rear supports are then oriented radially relative to the longitudinal axis of the instrument and arranged symmetrically relative to the aforementioned vertical plane, when the two rear supports are in an initial state corresponding in particular to a zero sideslip value and to a zero incidence angle.

In this same initial state, the rear supports preferably form with the vertical plane an angle such that the mounting of the instrument on the device is isostatic. This angle is for example approximately equal to 45°.

In the preferred embodiment of the invention, the rear supports are offset towards the rear by about one meter relative to the front support, along the longitudinal axis of the instrument.

Furthermore, the length adjustment means are constituted preferably by hydraulic jacks servo-controlled lengthwise.

To reduce as far as possible the airflow disturbance induced by the front and rear supports, each of these supports is generally placed inside a streamlined casing. This casing also provides thermal protection for the supports and contributes to their mechanical strength.

To provide control in real time of the configuration and flight attitudes of the instrument, angular measurement means such as resolvers are to advantage associated with the articulation means.

To take account of the significant increases in temperature which occur in the wind tunnel, in the vicinity of the instrument (about 350° C.), cooling means are additionally provided to cool the pivot connections and the angular measurement means located in the immediate vicinity of the instrument.

BRIEF DESCRIPTION OF THE DRAWINGS

A description will now be given, as a non-restrictive example, of a preferred embodiment of the invention, with reference to the appended drawings, in which.

DETAILED DESCRIPTION OF THE PREFERRED EMBODIMENT OF THE INVENTION

Figure 1:
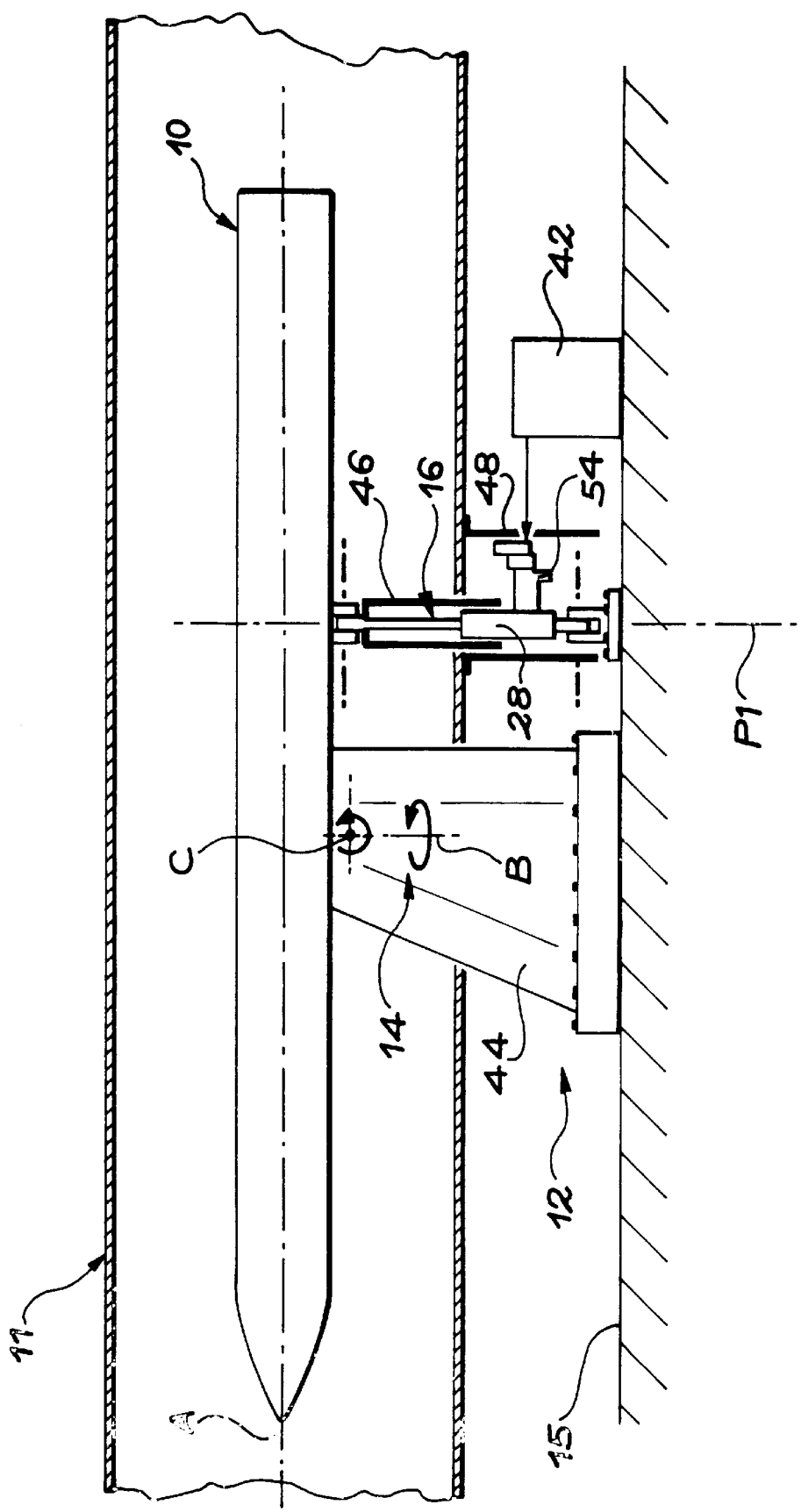
FIG. 1 is a side view showing diagrammatically a motorized flying instrument mounted in a wind tunnel by a mounting device according to the invention.
Figure 2:
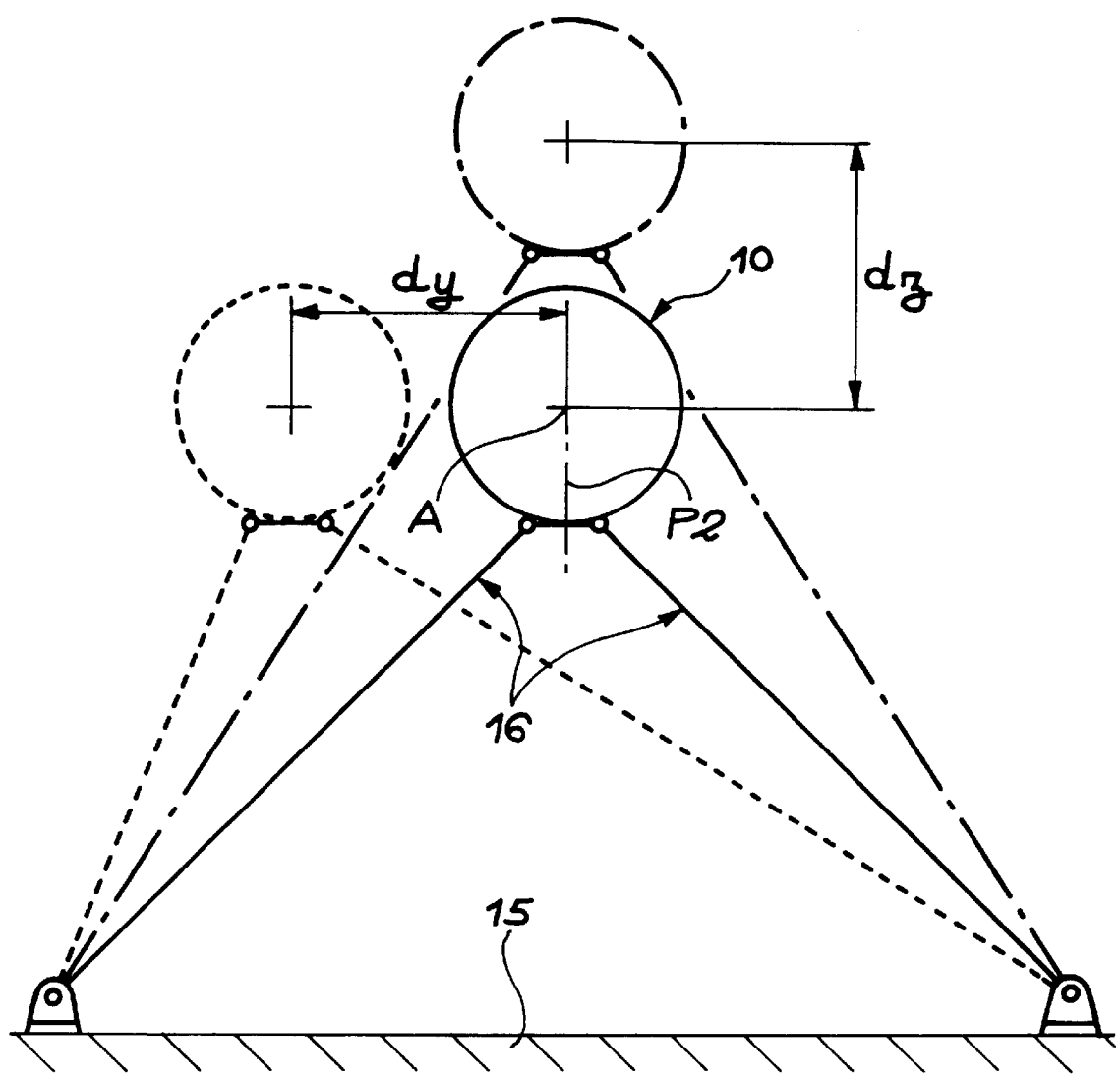
FIG. 2 is a front view showing the instrument diagrammatically in its initial state (solid line), with a modified incidence angle (dot and dash line) and with a modified sideslip value (dotted line)

In FIGS. 1 and 2, a diagram is given showing a flying instrument 10 such as a prototype or a missile model, placed in a wind tunnel 11. The flying instrument 10 is fitted with one or more motors intended to be switched on when wind tunnel tests are carried out.

In accordance with the invention, the flying instrument 10 is connected to the fixed structure of the wind tunnel by a support device 12 designed to simulate, in real time and hands off, changes in dynamics of the instrument 10, representative of the its flight attitudes when it passes through a given trajectory or trajectory fraction.

In the preferred embodiment of the invention shown in the figures, the support device 12 includes a front support 14 and two rear supports 16.

In this case, the front support 14, of invariable length, connects the instrument 10 to the floor 15 of the fixed structure of the wind tunnel 11. It is located in a vertical plane passing through the longitudinal axis A of the instrument 10 and oriented approximately radially downwards relative to this axis.

Figure 4:
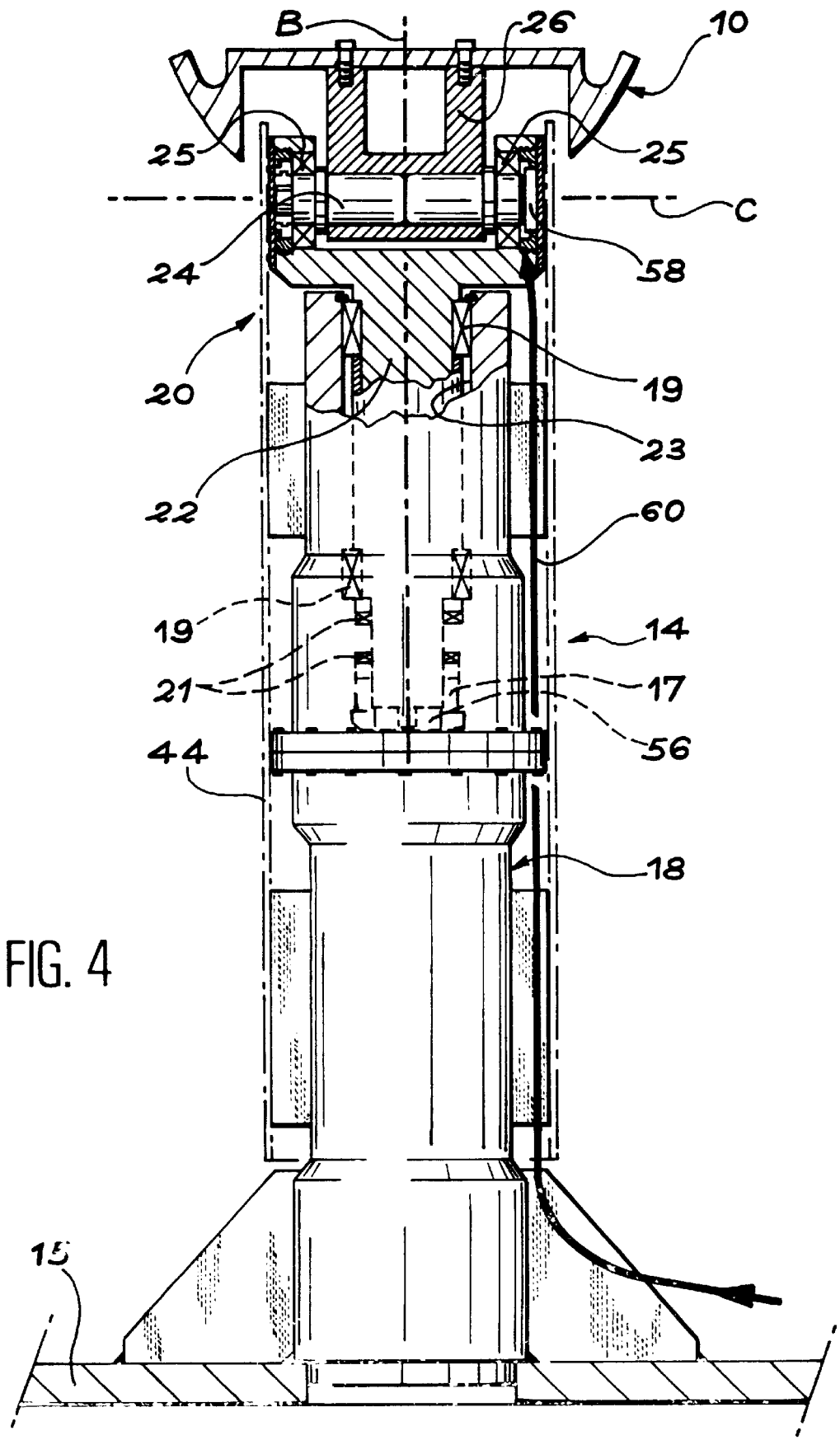
FIG. 4 is a front view, on a larger scale and in partial cross-section, of the front support.

As is shown more exactly in FIG. 4, the front support 14 includes a vertical pylon 18 constituted by a rigid metal tube the lower end of which is fixed to the floor 15 of the fixed structure of the wind tunnel 11 and the upper end of which supports the flying instrument 10, through articulation means 20. These articulation means 20 define at least two degrees of freedom of rotation around two axes B and C oriented along two directions orthogonal to each other and to the longitudinal axis A of the instrument 10. A first B of these two axes is merged with the vertical axis of the pylon 18. The second axis C, oriented along a transverse direction relative to the instrument 10, passes preferably approximately through its lower generator.

More exactly, the articulation means 20 include a vertical mast 22 a lower part of which forming a pivot is received into a bore 23 formed in the pylon 18, along the axis B. This arrangement allows the mast 22 to swivel freely around the vertical axis B of the pylon 18, by means of bearings 19. Thrust ball bearings 21, locked by a nut 17, are also provided between the foot of the pylon 18 and the mast 22, to give a system without play. The pylon 18 is made in two parts, to make it possible to mount the bearings 19, the stops 21 and a resolver 56 which will be described subsequently.

In its upper part, located above the pylon 18, the mast 22 forms a clevis in which is received a pivot 24, by means of bearings 25. This pivot 24 is integral with a complementary clevis 26 fixed under the flying instrument 10 on which tests are to be conducted. The axis of the pivot 24 corresponds to the transverse axis C defined previously. This arrangement allows the instrument 10 to swivel freely around the axis C, relative to the mast 22.

The clevis 26, by which the front support 14 is fixed to the flying instrument 10, is located in the front half of this instrument. However, this location is offset towards the rear relative to the front part of the instrument, so as not to disturb the airflow in this particularly sensitive region. By way of an example which is not in any way restrictive on the invention, the clevis 26 is located at least one third of the way up the length of the instrument 10, starting from its front point.

It may be noted that as an alternative, instead of being placed underneath the flying instrument 10, the front support 14 could be located above it and connected by its upper end to the ceiling (not shown) of the fixed structure of the wind tunnel 11.

As shown in FIG. 1, the two rear supports 16 are oriented radially relative to the longitudinal axis A of the instrument 10 and located in the same vertical plane P1 perpendicular to this axis, preferably about one meter behind the front support 10. More exactly, when the support device 12 is in its initial state, in which incidence and slip are zero, as shown in a solid line in FIG. 2, the two rear supports 16 (shown here diagrammatically in segments) are arranged symmetrically on either side of the vertical plane P2 passing through the front support 14 and through the longitudinal axis A of the instrument 10.

Figure 5:
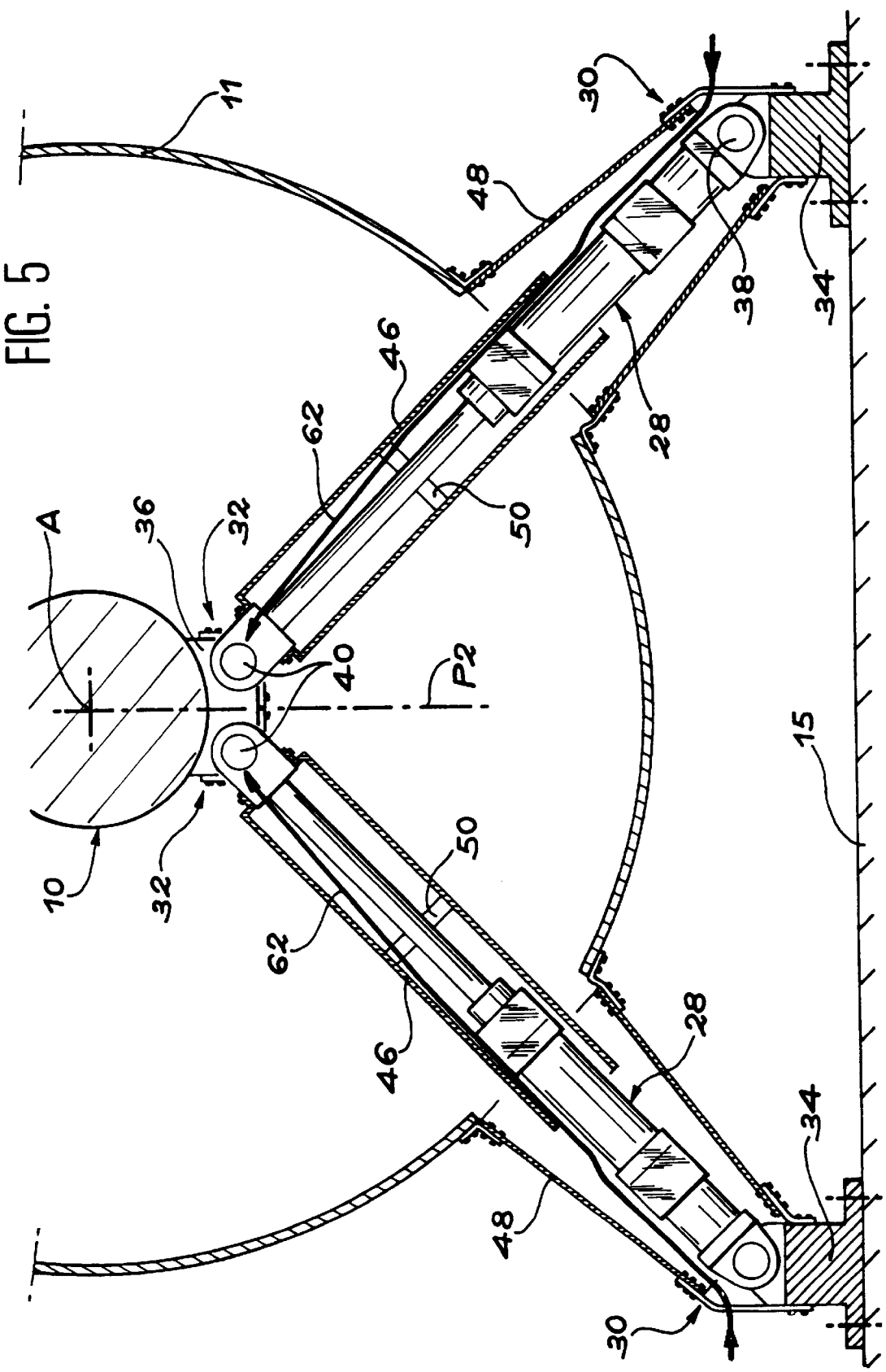
FIG. 5 is a front view, in partial cross-section, of the rear supports of the mounting device according to the invention.

As shown in FIG. 5, each of the rear supports 16 includes length adjustment means constituted, in the embodiment shown, by hydraulic jacks 28 servo-controlled lengthwise. More exactly, each of the rear supports 16 essentially includes a hydraulic jack 28 and two pivot connections 30 and 32 by which the opposite ends of the jack 28 are articulated on a first clevis 34 fixed to the floor 15 of the fixed structure of the wind tunnel 11 and a second clevis 36 fixed under the flying instrument 10 respectively.

The lower end of each of the hydraulic jacks 28 is articulated on the corresponding clevis 34 by a pivot 38 oriented parallel to the longitudinal axis A of the instrument 10. Comparably, the upper end of each of the hydraulic jacks 28 is articulated on the clevis 36 by a pivot 40 the axis of which is oriented parallel to the longitudinal axis A of the instrument 10.

When the support device 12 is in its previously defined initial state, the two hydraulic jacks 28 (and, consequently, the two rear supports 16) are the same length. Moreover, they are both inclined by 45° relative to the vertical plane P2 passing through the longitudinal axis A of the instrument, so as to form between them an angle of 90°.

The arrangement which has just been described is such that the mounting of the instrument 10 on the fixed structure of the wind tunnel, provided by the support device 12, is isostatic.

The hydraulic jacks 28 constituting the length adjustment means are connected to remote control means 42 (FIG. 1). These remote control means 42 act on the hydraulic jacks 28, in real time and hands off, so as to modify their length in a controlled way. It is thus possible to vary in real time and continuously characteristics specific to the attitude of the instrument in flight, such as sideslip and/or incidence, while the instrument motor is operating. This arrangement makes it possible to study the behavior of the instrument 10, with its motor on, under different attitudes and particularly during a complete trajectory or trajectory fraction able to be followed subsequently by the instrument.

So it can be seen in a dot and dash line in FIG. 2 that a same increase in length of each of the two jacks 28 is translated by an increase dz in the height of the instrument 10 in the vertical plane P1. Because the height of the instrument in the vertical plane passing through the front support 14 remains unchanged, we move from zero incidence to controlled negative incidence.

Comparably, it can be seen in a dotted line in FIG. 2 that the combination of an increase in length of one of the jacks 28 and a decrease in length of the other jack 28, in a controlled relationship by remote control means 42, is translated by a lateral offset dy of the instrument in the plane P12. We thus move from zero slip to controlled slip, to the right or to the left.

Figure 3:
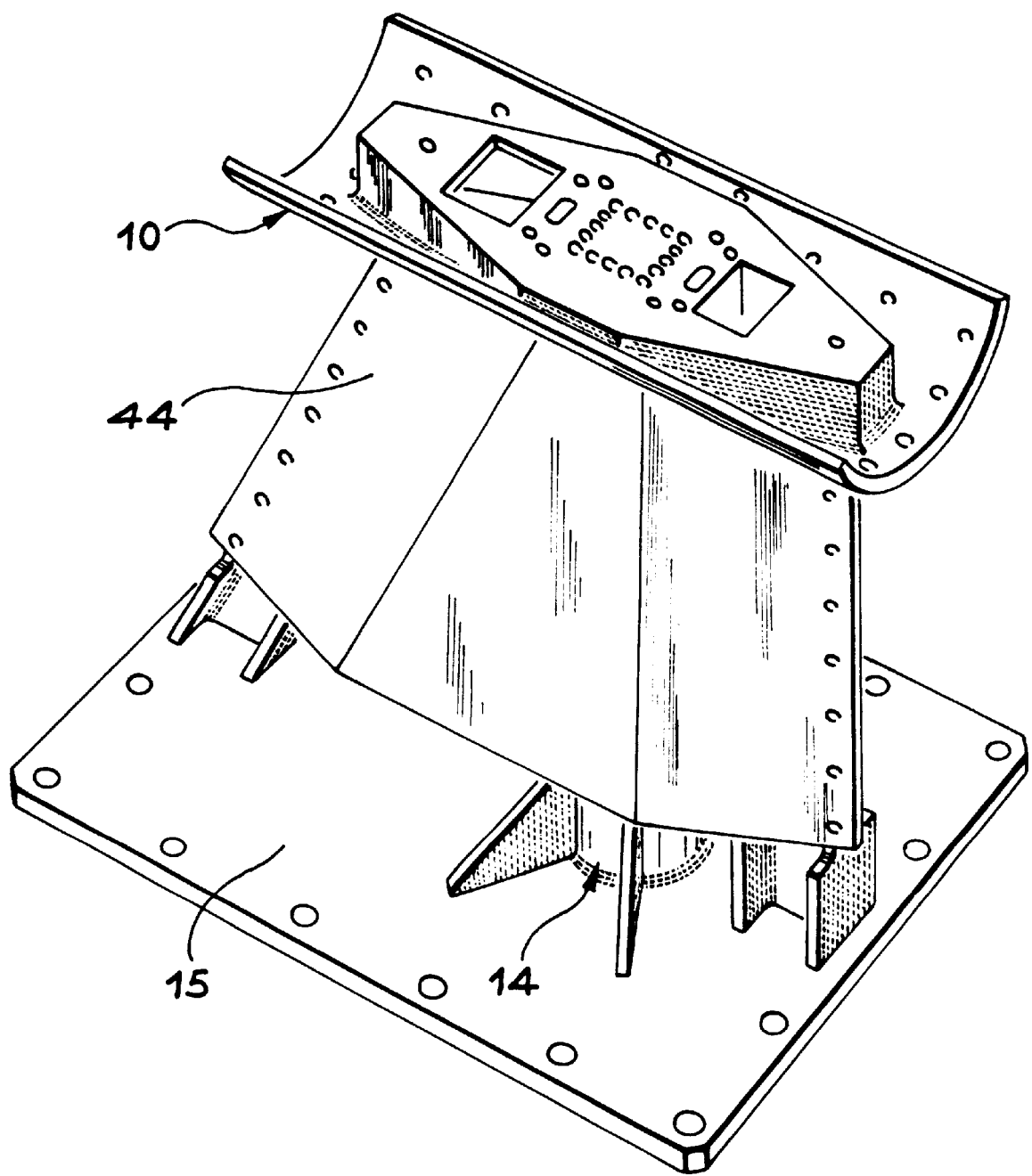
FIG. 3 is a perspective view of the encased front support of the mounting device according to the invention.

As shown in FIGS. 3 and 4, the front support 14, the length of which is invariable, is housed within a streamlined casing 44. This casing has in cross-section approximately the shape of a diamond with broken corners, the main diagonal of which is oriented parallel to the axis A of the instrument. It may be noted that the cross-section of the streamlined casing 44 steadily increases the further it gets from the instrument 10.

Comparably (FIG. 5), each of the rear supports 16 is placed within a streamlined casing 46 which also has in cross-section approximately the shape of a diamond the main diagonal of which is oriented parallel to the axis A of the instrument 10. The casing 46 is fixed to the upper end of the corresponding jack 28 articulated on the clevis 36 by the pivot 40. The lower end of each of the casings 46 penetrates freely in a sleeve 48 which surrounds the lower part of the jack 28. The lower and upper ends of each of the sleeves 48 are fixed to the clevis 34 and to the wind tunnel 11 respectively. The arrangement is such that the upper part of the sleeve 48 is connected to the wind tunnel 11 at a location such that the lower end of the casing 46 is always within the sleeve 48 when the jack 28 is extended to its maximum. The positioning of the lower part of the casing 46 around the jack 28 is provided by a centring bush 50 fixed to the casing 46 and allowing the jack rod 28 to slide (the casing 46 follows the movements of the jack).

Each of the sleeves 48 houses control components 54 (FIG. 1) of the corresponding jack 28. These control components 54 include particularly a servovalve and a clack valve system connected to the remote control means 42. The positioning of the control components 54 outside the wall 50 of the wind tunnel allows these components to be placed outside the hot areas located in the vicinity of the instrument being tested. These hot areas can in fact reach very high temperatures, generally in the region of 350° C.

So as to provide a very accurate control of the pivoting angles around the axes B and C defined by the articulation means 20 of the front support 14, a first angular measurement means 56 (FIG. 4) is interposed between the mast 22 and the pylon 18 to measure the rotations around the axis B and a second angular measurement means 58 is interposed between the mast 22 and the clevis 26, to measure the rotations around the axis C. These two angular measurement means 56 and 58 are constituted to advantage by resolvers able to supply an angular measurement with an accuracy of about one hundredth of a degree.

The first resolver 56 is placed inside the pylon 18. It is therefore protected from the high temperature prevailing inside the wind tunnel. On the other hand, the second resolver 58 is placed in the immediate vicinity of the wall of the instrument being tested and it is only separated from the very hot ambient air by the sheet of the casing 44.

Consequently, cooling means are to advantage provided for the resolver 58. These cooling means include a tube 60 (shown diagrammatically by a line in FIG. 4) housed inside the casing 44 and allowing cool air to be conveyed to the resolver 58 from a cooling system (not shown) located outside the wind tunnel 11.

Comparably, cooling means are provided to cool each of the pivots 40 by which the jacks 28 are articulated on the clevis 36 fixed to the instrument 10. Airflow rates from the cooling means are controlled by means of calibrated necks located at the end of the tubes, at the level of the parts to be cooled (for example 100 g/s). These cooling means include, in this case too, tubes 62 (shown diagrammatically by lines in FIG. 5) passing within the corresponding casing 46 and within the sleeve 48. At their end located outside the wind tunnel 11, these tubes 62 are also connected to a cooling circuit (not shown) delivering cold air. It may be noted that the tubes 62 comprise at least one telescopic or flexible part allowing them to support variations in length of the hydraulic jacks 28 of the corresponding rear supports 16.

Clearly, the invention is not restricted to the embodiment which has just been described as an example, but covers all its alternatives. Thus, it will be understood particularly that the front support and/or the rear supports could be placed not underneath but above the instrument being tested, without departing from the framework of the invention. Furthermore, the hydraulic jacks 28 can be replaced by electrical jacks, provided that their relatively long response time is compatible with the simulated trajectory, or by pneumatic jacks, provided that the volume taken up by the latter is not too restricting. Lastly, the articulation means 20 may incorporate a third degree of freedom of rotation orthogonal to the two degrees of freedom of rotation described.

What is claimed is:

1. A device (12) able to support a motorized flying instrument (10) in a wind tunnel, for the purpose of studying the behavior of said instrument (10), under different attitudes, said device comprising:

a plurality of articulated supports (14, 16) able to connect the motorized flying instrument (10) to a fixed structure (15) of the wind tunnel, at points offset relative to airflow zones located around a front part of the motorized flying instrument and upstream and downstream of the motor of said motorized flying instrument, said motor on, wherein at least one of said supports comprises means for adjusting support length (28), the device being characterized in that said means for adjusting support length (28) are connected to a remote control (42) able to modify in real time the motorized flying instrument attitude.

2. A device according to claim 1, wherein the supports comprises:

a front support (14), of invariable length, incorporating means for articulating (20) to at least two degrees of freedom of rotation around two axes (B, C) oriented along two directions orthogonal to each other and to a longitudinal axis (A) of the motorized flying instrument; and two rear supports (16) each incorporating means for adjusting support length (28) and pivot connections (30, 32).

3. A device according to claim 2, wherein the front support (14) is oriented along an approximately radial direction relative to the longitudinal axis of the motorized flying instrument (10) and arranged in a vertical plane (P2) passing through said longitudinal axis (A), the rear supports (16) being oriented along approximately radial directions relative to said longitudinal axis (A) and arranged symmetrically relative to said vertical plane (P2), when the two rear supports (16) are in an initial state.

4. A device according to claim 3, wherein, in their initial state, the rear supports (16) form with said vertical plane (P2) an angle such that the mounting of the motorized flying instrument (10) on the device (12) is isostatic.

5. A device according to claim 4, wherein said angle is approximately equal to 45°.

6. A device according to claim 3 wherein the rear supports (16) are offset towards the rear by about one meter relative to the front support (14), along said longitudinal axis (A).

7. A device according to claim 2 wherein the length adjustment means are hydraulic jacks (28) servo-controlled lengthwise.

8. A device according to claim 2, wherein each of said supports (14, 16) is placed inside a streamlined casing (44, 46).

9. A device according to claim 2, wherein first cooling means (62) are provided to cool the pivot connections (32) located in the immediate vicinity of the instrument.

10. A device according claim 2, wherein angular measurement means (56, 58) are associated with the articulation means (20), second cooling means (60) being provided to cool the angular measurement means (58) located in the immediate vicinity ofthe instrument.

* * * * *